US012723490B2

(12) United States Patent
Mason et al.

(10) Patent No.: US 12,723,490 B2
(45) Date of Patent: Sep. 1, 2026

(54) WELLBORE TREATMENT TO REMOVE DAMAGE AND INCREASE PRODUCTION

(71) Applicants: Aegis Chemical Solutions, LLC, Houston, TX (US); Saber Oxidation Technologies Inc., Slingerlands, NY (US)

(72) Inventors: John Y. Mason, Slingerlands, NY (US); Madeline Bette, Albany, NY (US)

(73) Assignees: Aegis Chemical Solutions, LLC, Houston, TX (US); Saber Oxidation Technologies Inc., Slingerlands, NY (US)

( * ) Notice: Subject to any disclaimer, the term of this patent is extended or adjusted under 35 U.S.C. 154(b) by 0 days.

(21) Appl. No.: 19/187,912

(22) Filed: Apr. 23, 2025

(65) Prior Publication Data

US 2025/0327375 A1 Oct. 23, 2025

Related U.S. Application Data

(60) Provisional application No. 63/637,466, filed on Apr. 23, 2024.

(51) Int. Cl.

| | |
|---|---|
| ***E21B 37/06*** | (2006.01) |
| ***C09K 8/40*** | (2006.01) |
| ***C09K 8/54*** | (2006.01) |
| ***E21B 43/16*** | (2006.01) |

(52) U.S. Cl.

CPC ................ *E21B 37/06* (2013.01); *C09K 8/40* (2013.01); *C09K 8/54* (2013.01); *E21B 43/16* (2013.01); *C09K 2208/32* (2013.01)

(58) Field of Classification Search

CPC ..................................................... E21B 43/164

See application file for complete search history.

(56) References Cited

U.S. PATENT DOCUMENTS

| | | | |
|---|---|---|---|
| 5,002,128 A | 3/1991 | Wiseman, Jr. | |
| 2015/0175876 A1* | 6/2015 | Resasco ................ | C09K 8/594 166/270.1 |
| 2015/0197686 A1 | 7/2015 | Mason | |
| 2018/0362838 A1 | 12/2018 | Skiba et al. | |
| 2019/0177601 A1* | 6/2019 | Belakshe .............. | C09K 8/532 |
| 2019/0292436 A1 | 9/2019 | Mason et al. | |

FOREIGN PATENT DOCUMENTS

WO 2013085410 A1 6/2013

OTHER PUBLICATIONS

PCT International Search Report and Written Opinion dated Aug. 1, 2025, PCT International Application No. PCT/US2025/026066, pp. 1-10.

* cited by examiner

*Primary Examiner* — William D Hutton, Jr.
*Assistant Examiner* — Avi T Skaist
(74) *Attorney, Agent, or Firm* — Grollitsch Law, PLLC

(57) ABSTRACT

A method for treating a wellbore includes pumping a chemical solution into the wellbore. The method also includes pumping a gas into the wellbore. The gas strips a portion of the chemical solution from a liquid state into a gas state within the wellbore.

20 Claims, 6 Drawing Sheets

500

| Stage | Step | Fluid | Systems |
|---|---|---|---|
| Prep | --- | Spacer Fluid (Brine or Freshwater) | Pump Truck |
| Stage 1 | 1.1 | Chlorine Dioxide | Chloride Dioxide Generation Unit & Pump Truck |
| | 1.2 | Spacer Fluid (Brine or Freshwater) | Pump Truck |
| | 1.3 | Acid (15% HCl Acid) | Pump Truck |
| | 1.4 | Spacer Fluid (Brine or Freshwater) | Pump Truck |
| Stage 2 | 2.1 | Chlorine Dioxide & Gas (Nitrogen) | Chloride Dioxide Generation Unit, Pump Truck & Nitrogen Unit |
| | 2.2 | Spacer Fluid (Brine or Freshwater) & Gas (Nitrogen) | Pump Truck & Nitrogen Unit |
| | 2.3 | Acid (15% HCl Acid) & Gas (Nitrogen) | Pump Truck & Nitrogen Unit |
| | 2.4 | Spacer Fluid (Brine or Freshwater) & Gas (Nitrogen) | Pump Truck & Nitrogen Unit |
| Stage 3 | 3.1 | Chlorine Dioxide & Gas (Nitrogen) | Chloride Dioxide Generation Unit, Pump Truck & Nitrogen Unit |
| | 3.2 | Spacer Fluid (Brine or Freshwater) & Gas (Nitrogen) | Pump Truck & Nitrogen Unit |
| | 3.3 | Acid (15% HCl Acid) & Gas (Nitrogen) | Pump Truck & Nitrogen Unit |
| | 3.4 | Spacer Fluid (Brine or Freshwater) & Gas (Nitrogen) | Pump Truck & Nitrogen Unit |

| Stage | Step | Fluid | Systems |
|---|---|---|---|
| Prep | --- | Spacer Fluid (Brine or Freshwater) & Gas (Nitrogen) | Pump Truck & Nitrogen Unit |
| Stage 1 | 1.1 | Chlorine Dioxide & Gas (Nitrogen) | Chlorine Dioxide Generation Unit, Pump Truck & Nitrogen Unit |
| | 1.2 | Spacer Fluid (Brine or Freshwater) & Gas (Nitrogen) | Pump Truck & Nitrogen Unit |
| | 1.3 | Acid (15% HCl Acid) & Gas (Nitrogen) | Pump Truck & Nitrogen Unit |
| | 1.4 | Spacer Fluid (Brine or Freshwater) & Gas (Nitrogen) | Pump Truck & Nitrogen Unit |
| Stage 2 | 2.1 | Chlorine Dioxide & Gas (Nitrogen) | Chlorine Dioxide Generation Unit, Pump Truck & Nitrogen Unit |
| | 2.2 | Spacer Fluid (Brine or Freshwater) & Gas (Nitrogen) | Pump Truck & Nitrogen Unit |
| | 2.3 | Acid (15% HCl Acid) & Gas (Nitrogen) | Pump Truck & Nitrogen Unit |
| | 2.4 | Spacer Fluid (Brine or Freshwater) & Gas (Nitrogen) | Pump Truck & Nitrogen Unit |
| Stage 3 | 3.1 | Chlorine Dioxide & Gas (Nitrogen) | Chlorine Dioxide Generation Unit, Pump Truck & Nitrogen Unit |
| | 3.2 | Spacer Fluid (Brine or Freshwater) & Gas (Nitrogen) | Pump Truck & Nitrogen Unit |
| | 3.3 | Acid (15% HCl Acid) & Gas (Nitrogen) | Pump Truck & Nitrogen Unit |
| | 3.4 | Spacer Fluid (Brine or Freshwater) & Gas (Nitrogen) | Pump Truck & Nitrogen Unit |

WELLBORE TREATMENT TO REMOVE DAMAGE AND INCREASE PRODUCTION

CROSS-REFERENCE TO RELATED APPLICATIONS

This application claims priority to U.S. Provisional Patent Application No. 63/637,466, filed on Apr. 23, 2024, which is incorporated by reference.

BACKGROUND

Wellbores have been treated with liquids such as acid and other chemicals (e.g., chlorine dioxide) for almost 120 years to remove damage and increase production. It is generally accepted, however, that only a portion of a horizontal (also referred to as lateral) portion of the wellbore is treated by such liquids, even with sophisticated diversion methods. More particularly, in conventional production, treatment is quite simple and effective because the producing zones are relatively short in length compared to modern horizontal completions. For example, conventional wells have producing zones in tens or hundreds of feet whereas modern horizontal wells having lengths of up to 17,000 feet in Texas, 35,000 feet in Alaska, and 50,000 feet in Saudi Arabia.

Given that the typical frac rate is about 80 to 120 barrels of frac fluid (bbl) per minute over a typical 200-250 foot isolated interval, this puts the flow rate during fracking at about 17-20 barrels per minute (bpm)/foot rate. With typical frac stage volumes ranging from 6,000 to 15,000 bbls, this put the fluid only volume per foot at about 1200 to 2500 gallons per foot of isolated interval. In contrast, acidizing or chemical well treatment rates for near wellbore damage are typically only applied at 10 to 200 gallons per foot, with the most common being 30 to 70 bbl per foot. Even if it is assumed that the volume of a group of fractures could be economically and successfully isolated to the equivalent of a 200 foot interval, this would require a treatment volume of about 6000 to 15000 bbls of treatment fluid to treat the volume of the fractures. This is very large in comparison to the typical acidizing for chemical treatment volume of 50 to 1000 bbls, or less than 7% of the volume needed to treat the fractured interval. Therefore, there is a need for an effective method and system to treat a wellbore to remove damage and increase production.

SUMMARY

A method for treating a wellbore is disclosed. The method includes pumping a chemical solution into the wellbore. The method also includes pumping a gas into the wellbore. The gas strips a portion of the chemical solution from a liquid state into a gas state within the wellbore.

Another method for treating a wellbore is disclosed. The method includes pumping chlorine dioxide into the wellbore. This method further includes pumping a spacer fluid in the wellbore. Additionally, the method includes pumping a gas into the wellbore, wherein the gas strips a portion of the chlorine dioxide from a liquid state into a gas state within the wellbore.

A system for treating a wellbore is provided. The system includes a chlorine dioxide unit having chlorine dioxide that is pumped into the wellbore. The method also includes a gas unit having a gas that is pumped into the wellbore, wherein the gas strips a portion of the chlorine dioxide from a liquid state into a gas state within the wellbore. The system further includes a spacer fluid unit having a spacer fluid that is pumped into the wellbore. Additionally, the system includes an acid unit having an acid that is pumped into wellbore.

BRIEF DESCRIPTION OF THE DRAWINGS

The present disclosure may best be understood by referring to the following description and accompanying drawings that are used to illustrate embodiments of the invention. In the drawings:

FIG. 5 illustrates a chart showing a pump schedule using chlorine dioxide and acid with delayed gas, according to an embodiment.

FIG. 6 illustrates a chart showing a pump schedule using chlorine dioxide and acid with continuous gas, according to an embodiment.

DETAILED DESCRIPTION

Figure 1:
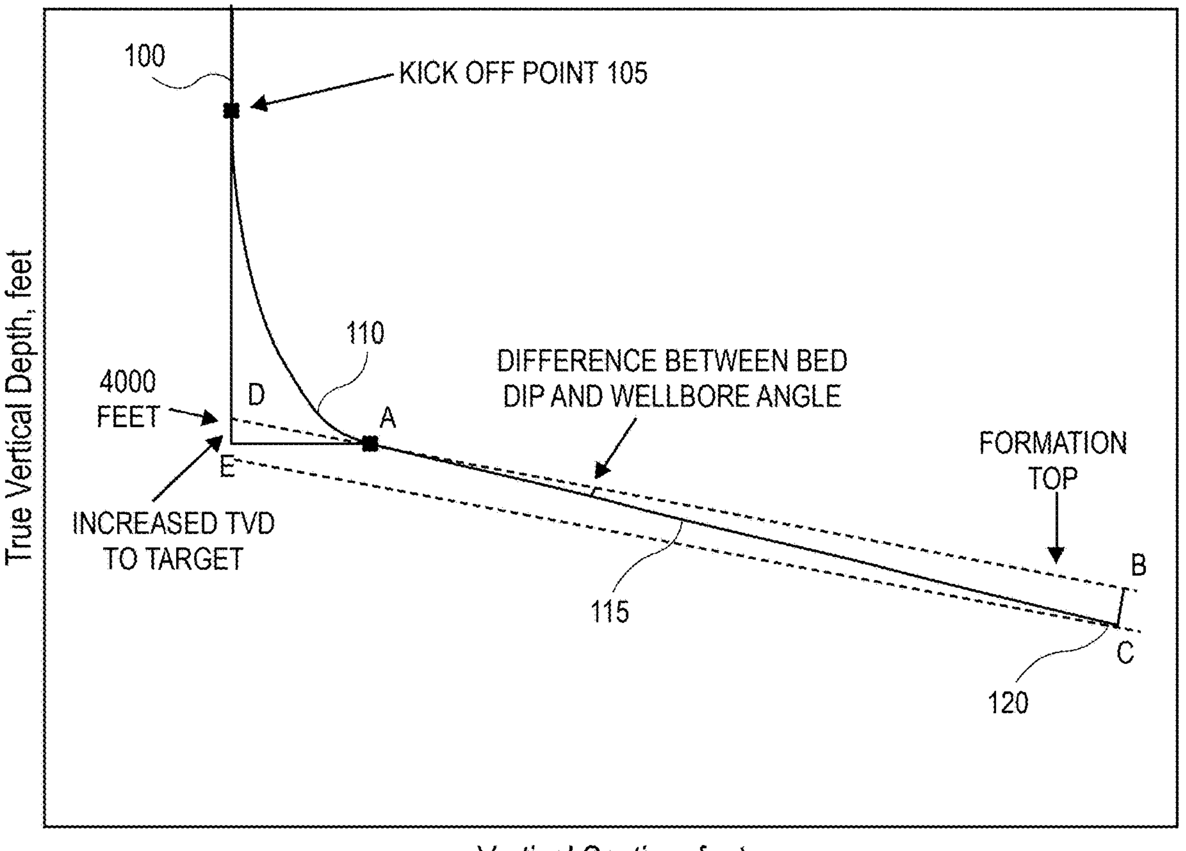
FIG. 1 illustrates a schematic side view of a wellbore in a subterranean formation, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms “including” and “comprising” are used in an open-ended fashion, and thus should be interpreted to mean “including, but not limited to.” All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or embodiments disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight. The amounts given are based on the active weight of the material.

Unless otherwise specified, "wellbore" is used to include the drilled hole, any surface or subsurface materials or equipment installed by an oilfield operator, and the reservoir from which oil, gas, and/or water may be extracted.

Unless otherwise specified, "water" is used to include brines and other fluids in which the chlorine dioxide ($ClO_2$) is transported from the reactor to the wellbore or used as a spacer or flush during the procedure that are compatible with the formation and the equipment.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

The present disclosure may include a system and method for treating a wellbore to remove damage and/or increase production. The system and method may be applicable to all types of wells, such as conventional wells, unconventional wells, injection wells, disposal wells, production wells, environmental wells, water wells, or a combination thereof. The system and method may also or instead be used to treat a pipeline. The system and method may cause treatment chemicals to flow farther through a wellbore and/or out into a formation, or to treat areas that would otherwise not be treated in a conventional approach than is achieved via conventional techniques. This may enable the treatment chemicals to absorb into the damaged areas and/or into areas where hydrocarbons are not released from the formation, which may increase production.

The treatment may be accomplished by introducing (e.g., pumping) one or more fluids into the wellbore. More particularly, chlorine dioxide (e.g., in a liquid state) may be pumped into the wellbore with either water or brine as part of a first step. Water and/or brine may then be pumped into the wellbore as part of a second step. An acid (e.g., in a liquid state) may then be pumped into the wellbore as part of a third step. In an example, the acid may be or include hydrochloric acid (HCl), hydrofluoric acid (HF), or a combination thereof.

Once the fluid flow has been established, a gas may be introduced as part of the first (e.g., chlorine dioxide) step and/or the third (e.g., acid) step, and/or any other step of the treatment. For example, the gas may be pumped into the wellbore simultaneously with the chlorine dioxide, the acid, the water, or a combination thereof. The gas may be pumped continuously or intermittently, and depending upon the wellbore and damage therein, can continue through the entire treatment cycle (e.g., steps 1, 2, and/or 3). The gas may be pumped after all fluid steps of the treatment have been completed, in some instances, as long as twelve hours after fluids have been pumped.

The liquid containing the treatment chemicals (e.g., chlorine dioxide and/or acid) may not flow as far as the gas will flow. However, when the gas interacts with the liquid treatment chemicals, a portion of the treatment chemicals may be stripped from the liquid state into a gas state. Stripping is a physical separation process where one or more components are removed from a liquid by a gas (e.g., vapor). Thus, stripping the treatment chemicals into the gas state may allow them to travel farther into the wellbore and/or formation—to places that the liquid state does not reach. This may change dynamics of the flow patterns, allowing for broader coverage of the formation and deeper penetration of the treatment chemicals.

In addition, both chlorine dioxide and acid are both highly soluble. Thus, once a portion of the chlorine dioxide and/or acid is stripped from the liquid stream and flows with the gas stream, it may rapidly be absorbed into any materials that it would be soluble and/or react with as they are encountered. This may remove damage and/or increase production.

FIG. 1 illustrates a schematic side view of a wellbore 100 in a subterranean formation, according to an embodiment. The wellbore 100 may include a kickoff point 105, a heel 110, a horizontal/lateral section 115 and a toe 120. FIG. 1 shows a total down position on a horizontal wellbore. When looking at this type of design, the fluid may be expected to flow to the toe 120 of the wellbore 100. However, the distance between the kickoff point 105 and the toe 120 may be thousands of feet, as such this fluid flow may not occur. Also, regardless of toe up or toe down orientation, "hills and valleys" may be present. This can cause fluid to pool in areas and/or create preferential flow issues. However, the use of the two-phase treatment approach described herein may allow for the flow of the gas and the introduction of turbulent flow across the horizontal/lateral section 115. In some embodiments, the wellbore 100 may be completed in a "toe up" configuration, which may make the perforations toward the heel 110 of the wellbore 100 preferentially take most if not all of chemical treatments, further demonstrating the potential utility of simultaneous gas and liquid phase treatment potential to cover a greater extent of the wellbore.

In one example, if the casing (not shown) in this wellbore 100 is 5½ inches for the entire length of the horizontal/lateral section 115, the volume of the fluid required to fill the interior may be approximately 100 barrels per 5000 feet. The vertical volume may depend on the size of the casing from the surface to the kickoff point 105.

Figure 2:
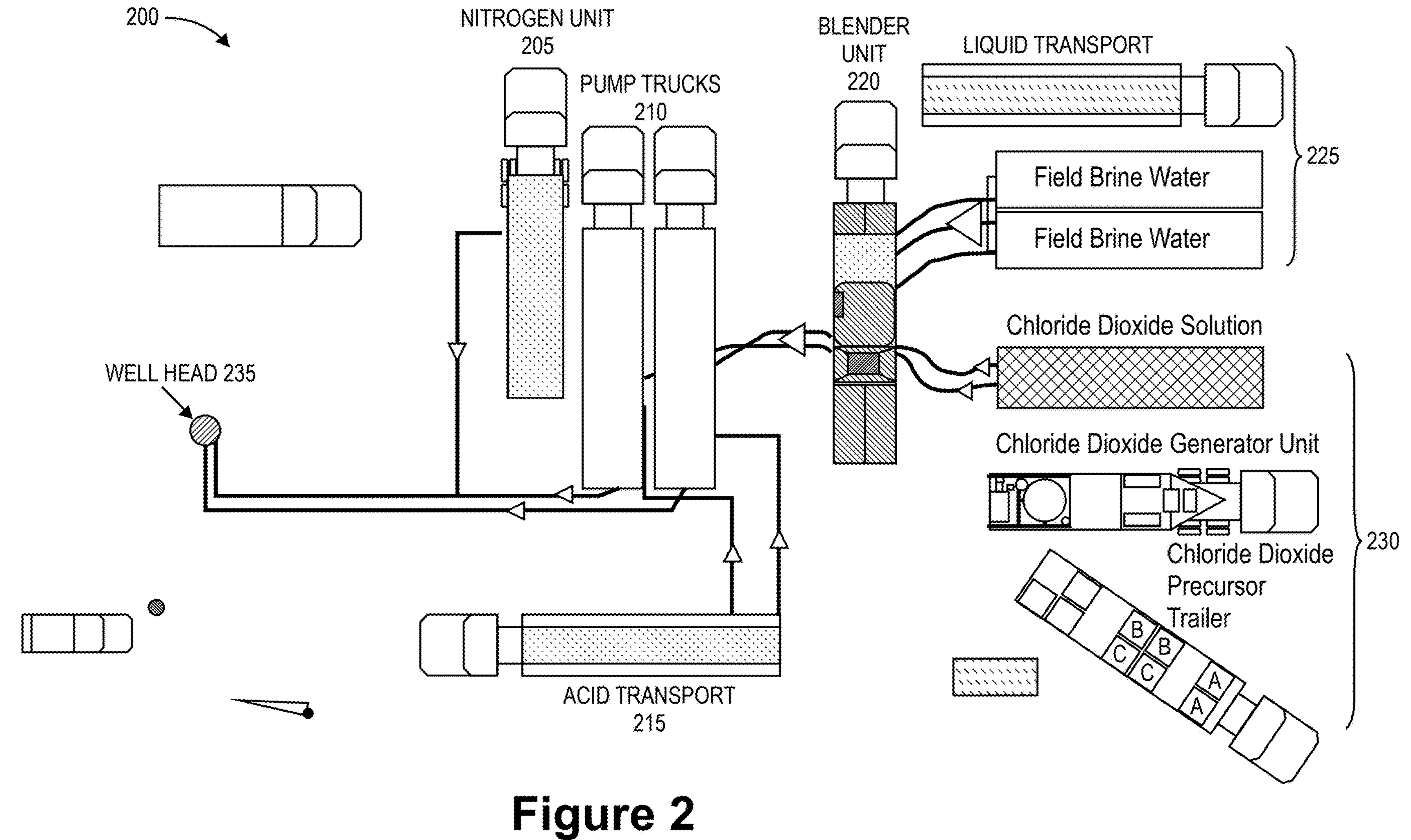
FIG. 2 illustrates a plan view a system for treating a wellbore, according to an embodiment.

FIG. 2 illustrates a plan view of a system 200 for treating a wellbore 235, according to an embodiment. The system 200 may include a gas unit (e.g., nitrogen unit) having a gas 205, that is configured to be pumped into the wellbore 235. The gas 205 may be or include carbon dioxide, nitrogen, methane, natural gas, field gas, any other inert gas, or a combination thereof.

The system 200 may also include pumps 210 (e.g., pump trucks) that are configured to pump fluid into the wellbore 235 as described herein. The system 200 may further include a blender unit 220 that is configured to receive a spacer fluid 225 from a spacer fluid unit and chlorine dioxide solution 230 (i.e., chemical solution) from a chlorine dioxide unit. The spacer fluid 225 may include freshwater, natural or artificial brines, produced water, xylene, hexane, kerosene, or a combination thereof.

The blender unit 220 is connected to the pump 210. During the wellbore 235 treatment process, the blender unit 220 selectively receives the spacer fluid 225 and the chlorine dioxide solution 230 and directs the respective fluid to the pump 210 for injection into the wellbore 235. The system 200 may additionally include an acid unit (e.g., acid transport) having an acid solution 215. The pump 210 is used to pump the acid solution 215 into the wellbore 235.

Figure 3:
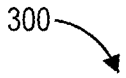
FIG. 3 illustrates a flowchart of a method for treating a wellbore, according to an embodiment.
Figure 3:
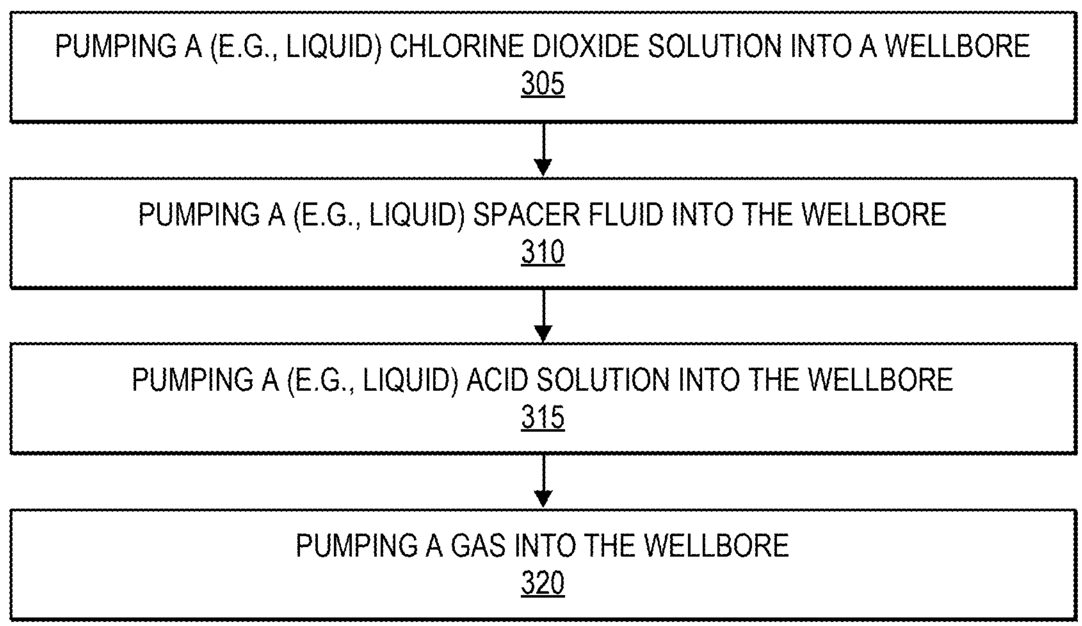

FIG. 3 illustrates a flowchart of a method 300 for treating a wellbore, according to an embodiment. An illustrative order of the method 300 is provided below; however, one or more steps of the method 300 may be performed in a different order, simultaneously, repeated, or omitted.

The method 300 may include pumping a chlorine dioxide solution into a wellbore, as at 305. This may be referred to as a first step. The chlorine dioxide solution 230 may be pumped by one or more pumps 210 at the surface to establish flow into the wellbore 235. The chlorine dioxide solution 230 may be pumped in a liquid state. The chlorine dioxide solution 230 may also include a water-based or hydrocarbon-based solution that is not reactive with the chlorine dioxide. Examples of the water-based or hydrocarbon-based solution may include freshwater, natural brines, produced water, xylene, hexane, and kerosene. In one embodiment, the water-based or hydrocarbon-based solution may begin flowing into the wellbore before the (e.g., liquid) chlorine dioxide.

The chlorine dioxide may contain additives including chelation agents and/or micellar solvents. The chlorine dioxide may be at concentrations between about 500 and about 5000 mg/l, but higher concentrations may be used depending upon the type of damage and formation. In an example, the chlorine dioxide concentration may be from about 2500 to about 3500 mg/l. The chlorine dioxide may be free from contamination of chlorine, and slightly acidic to neutral pH.

The chlorine dioxide solution 230 may be pumped at the maximum flow rate and pressure called for in the job design. These rates may be determined by the structural characteristics of the wellbore 235 itself with limitations on these rates determined prior to the job. These rates can range from 1 to 10 barrels per minute during the beginning of the job up to the maximum rate allowed by pressure restraints or up to a maximum flow rate to avoid exceeding the frac gradient.

As liquids and gases flow through the formation into the fractures and towards the wellbore 235, the rate of flow increases subject to the inverse square function. This may increase the pressure drop over a given distance. As such, the lighter-end hydrocarbons and gases continue to move while the heavier (e.g., thicker/more viscous) material is left behind. Chlorine dioxide affects the ability of these materials to release from lithic material in the formation, allowing them to be removed from the micropores and surfaces that make up the producing zone. This heavier hydrocarbon material can be damaging by itself. Its removal results in an increase in permeability.

Testing shows that the rock is not dissolving. Rather, the absorption of the chlorine dioxide makes the heavier hydrocarbons (and lighter hydrocarbons) flow through the formation more easily. The chlorine dioxide may act as an oxidant and/or a surface-active, wettability-changing agent. If chlorine dioxide is not an oxidant, this effect may be more pronounced because it would last longer in the formation. In producing well work and/or injection work, a long-term effect may be seen, which can be explained (e.g., when compared to conventional acidizing methods) by the chlorine dioxide removing things that the conventional methods do not. For example, shallower slopes or rates of decline on injection and/or production may be seen in response to the chlorine dioxide when compared to conventional treatments. Therefore, the treatment described herein is removing something that agglomerate's contamination.

In addition, the longevity of the efficacy of the treatment may or may not be solely to the wettability change that the $ClO_2$ is inducing. There may also be several other damaging agents that the $ClO_2$ is oxidizing (e.g., polymer, FeS, microemulsions, etc.), which may directly contribute to the treatment longevity in addition to the surfactant effect.

The chlorine dioxide may remove the damage from the cores and result in about a 40% increase in permeability on the virgin core. Material was not found that was eluted from the core. Several other oxidants, sodium hypochlorite, hydrogen peroxide, sodium chlorite, and sodium persulfate may also be pumped into the wellbore. Even though more than 10× of these chemicals may be applied (e.g., from a stoichiometric perspective), only a slight improvement may be seen in comparison to the use of acid in removal of damage. A stimulation effect on the cores themselves may not be seen. This points to chlorine dioxide's functionality as something other than an oxidant. In addition, in this group of oxidants, chlorine dioxide has the lowest redox potential.

With respect to chlorine dioxide's performance as an oxidant, other damaging agents such as iron sulfide, polymer, and biomass tend to form a semi-solid or gelatinous emulsion with water and hydrocarbon. This material has been referred to in literature as SMOO, and in many instances is misidentified as iron sulfide paraffin mixtures.

Chlorine dioxide is more soluble in many hydrocarbons and emulsions than it is in water or brines. Unlike acid, which is nearly strictly ionic in nature, this allows the chlorine dioxide to penetrate rapidly through the hydrocarbon or emulsion and destroy the sulfides and other compounds that stabilize the emulsion. This allows these damaging agents to then be removed or to be accessible to the acid added as part of the process and be dissolved.

Referring again to FIG. 3, the method 300 may also include pumping a spacer fluid into the wellbore, as at 310. This may be referred to as the second step. The spacer fluid 225 may be pumped by the one or more pumps 210 at the surface to establish or maintain flow into the wellbore. The spacer fluid 225 may be pumped before and/or after the chlorine dioxide solution 230. The spacer fluid 225 may also or instead be pumped before an acid solution, which is described below. The pump rate may be maintained during this step. The volume of the spacer fluid may be a minimum of 10 barrels or 2 to 3 minutes of pump time. In one embodiment, the spacer fluid 225 may include an acid corrosion inhibitor to prevent corrosion to the pumping equipment or the metallurgy of the wellbore. The corrosion inhibitor may be volatile and functional either by liquid or gaseous deposition to the metallurgy. The corrosion inhibitor may be or include a filming amine.

The method 300 may also include pumping an acid solution into the wellbore, as at 315. This may be referred to as the third step. The acid solution 215 may be or include hydrochloric acid (HCl) to dissolve the acid-soluble materials that have been exposed by the chlorine dioxide. The acid solution 215 may be pumped at the same rate, and as discussed before, may be further enhanced by acid travel with the gas.

The method 300 may also include pumping a gas into the wellbore, as at 320. The gas 205 may be pumped simultaneously with the chlorine dioxide solution 230, the spacer fluid 225, the acid solution 215, or a combination thereof. The gas 205 may also or instead be pumped after all fluid (e.g., liquid) steps of the treatment have been pumped. The gas 205 may be or include carbon dioxide, nitrogen, methane, natural gas, field gas, any other inert gas, or a combination thereof. The gas 205 may not be any mixture containing oxygen. As mentioned above, the gas 205 may strip a portion of the chlorine dioxide and/or the acid from its liquid state into the gas state, which may allow the chlorine dioxide and/or acid to flow farther into the wellbore and/or formation than it could in the liquid state.

The acid (e.g., HCl) may have a concentration greater than 15% (e.g., from about 20% to about 50%) to promote stripping. As the two gases (e.g., chlorine dioxide and HCl) travel with the carrier gas (e.g., nitrogen), they may encounter aqueous or organic-based damage in the wellbore. Both gases may readily dissolve back into the damaged areas in the wellbore to treat the damaged areas.

The supersaturation of the fluid with gas (e.g., nitrogen, chlorine dioxide, and/or HCl) may contribute to turbulent flow through the wellbore (e.g., casing, tubing, and/or treatment zone). This may also promote a wider distribution of the treatment. As the formation takes up the treatment, and pressure drops, the gas may expand to encompass more of the treatment zone carrying the chlorine dioxide and/or the acid with it. Additionally, the use of the gas and liquid may allow the acid and/or the chlorine dioxide to travel further into the formation in the gas state, reaching areas that would not be able to be reached with a liquid alone.

EXAMPLE

Figure 4:
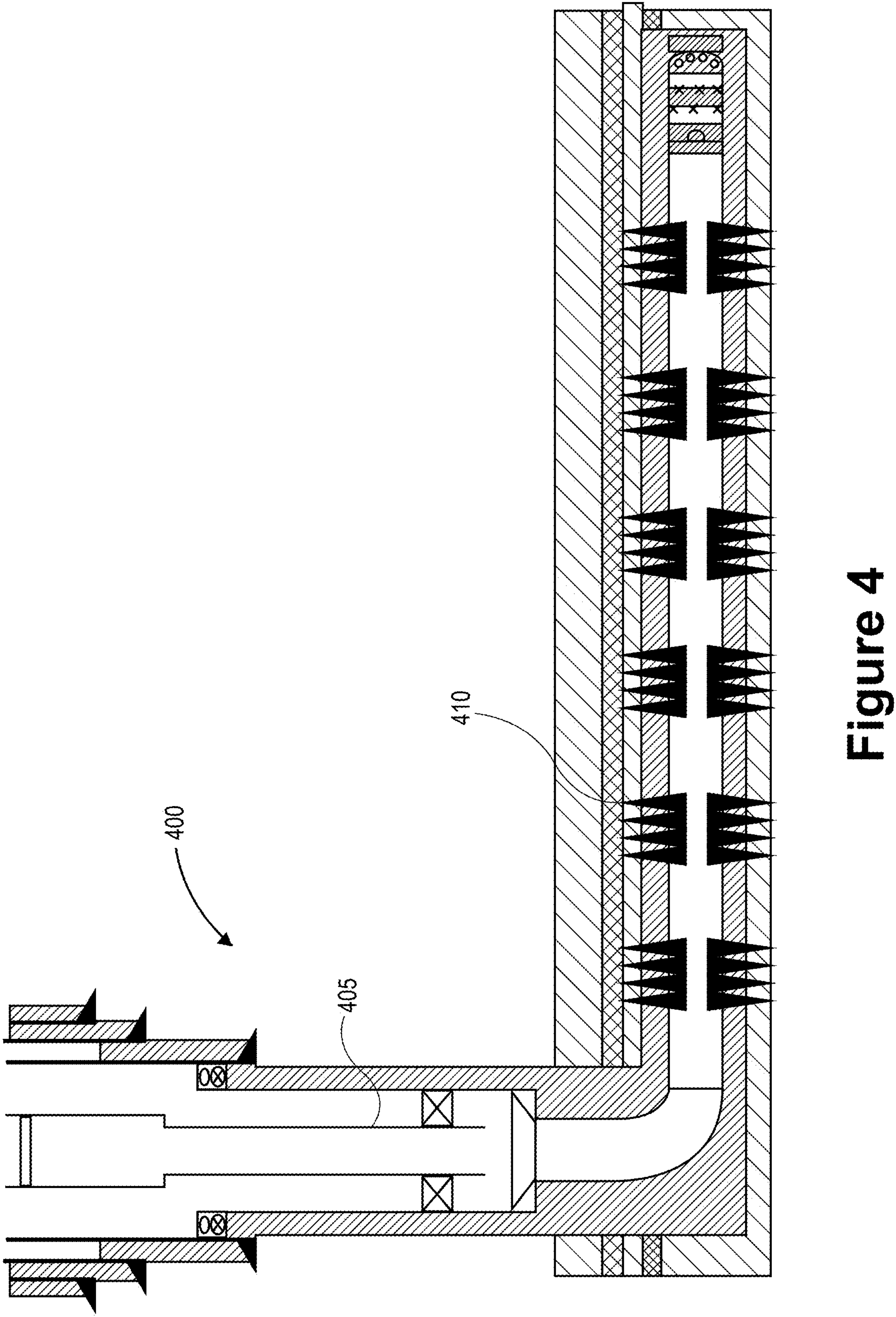
FIG. 4 illustrates a schematic side view of another wellbore in a subterranean formation, according to an embodiment.

FIG. 4 illustrates a schematic side view of another wellbore 400 in a subterranean formation, according to an embodiment. For the purposes of this example, it is to be assumed that there are 5000 feet of vertical from the horizontal to the surface, that everything is in 5½ inch casing 405, and that pumping is through the casing 405 (e.g., no tubing is in place). Let us also assume there are 10,000 feet of horizontal that was fracked in stages 410, such as fifty 200 foot stages.

For this job, a user may be pumping at 30 barrels per minute for eight stages, with each stage having a volume of 90 barrels of chlorine dioxide (with 6 bpm of nitrogen), 30 barrels of water (with 6 bpm of nitrogen), and 30 barrels of acid (with 6 bpm of nitrogen), then 30 barrels of water. The chlorine dioxide may contain 20 gallons per thousand (GPT) of micellular solvent and chelation agent. The water may contain 3 GPT corrosion inhibitor. The acid may be 15% hydrochloric acid containing 3 GPT of corrosion inhibitor and 20 GPT micellar solvent and chelation agent.

Operational Sequence

FIG. 5 illustrates a chart showing a pump schedule 500 using chlorine dioxide and acid with delayed gas, according to an embodiment. The pump schedule 500 will be described in relation to the system 200 in FIG. 2. Prior to the pump stages, a prep process 505 may include pumping the spacer fluid 225 (brine) into the wellbore 235 using pumps 210.

A first stage 510 of the pump schedule 500 may include pumping chlorine dioxide 230 (step 1.1) into the wellbore 235 by using pumps 210. The first stage 510 may further include pumping the spacer fluid 225 (step 1.2) into the wellbore 235 by using pumps 210. The first stage 510 may also include pumping the acid 215 (step 1.3) into the wellbore 235 by using pumps 210. Additionally, the first stage 510 may include pumping the spacer fluid 225 (step 1.4) into the wellbore 235 by using pumps 210.

A second stage 515 of the pump schedule 500 may include pumping chlorine dioxide 230 by using pumps 210 and the gas 205 (step 2.1) into the wellbore 235. The second stage 515 may further include pumping the spacer fluid 225 by using pumps 210 and the gas 205 (step 2.2) into the wellbore 235. The second stage 515 may also include pumping the acid 215 by using pumps 210 and the gas 205 (step 2.3) into the wellbore 235. Additionally, the second stage 515 may include pumping the spacer fluid 225 by using pumps 210 and the gas 205 (step 2.4) into the wellbore 235.

A third stage 520 of the pump schedule 500 may include pumping chlorine dioxide 230 by using pumps 210 and the gas 205 (step 3.1) into the wellbore 235. The third stage 520 may further include pumping the spacer fluid 225 by using pumps 210 and the gas 205 (step 3.2) into the wellbore 235. The third stage 520 may also include pumping the acid 215 by using pumps 210 and the gas 205 (step 3.3) into the wellbore 235. Additionally, the third stage 520 may include pumping the spacer fluid 225 by using pumps 210 and the gas 205 (step 3.4) into the wellbore 235.

FIG. 6 illustrates a chart showing a pump schedule 600 using chlorine dioxide and acid with continuous gas, according to an embodiment. The pump schedule 600 will be described in relation to the system 200 in FIG. 2. Prior to the pump stages, a prep process 605 may include pumping the spacer fluid 225 (brine) into the wellbore 235 using pumps 210.

A first stage 610 of the pump schedule 600 may include pumping chlorine dioxide 230 by using pumps 210 and the gas 205 (step 1.1) into the wellbore 235. The first stage 610 may further include pumping the spacer fluid 225 by using pumps 210 and the gas 205 (step 1.2) into the wellbore 235. The first stage 610 may also include pumping the acid 215 by using pumps 210 and the gas 205 (step 1.3) into the wellbore 235. Additionally, the first stage 610 may include pumping the spacer fluid 225 by using pumps 210 and the gas 205 (step 1.4) into the wellbore 235.

A second stage 615 of the pump schedule 600 may include pumping chlorine dioxide 230 by using pumps 210 and the gas 205 (step 2.1) into the wellbore 235. The second stage 615 may further include pumping the spacer fluid 225 by using pumps 210 and the gas 205 (step 2.2) into the wellbore 235. The second stage 615 may also include pumping the acid 215 by using pumps 210 and the gas 205 (step 2.3) into the wellbore 235. Additionally, the second stage 615 may include pumping the spacer fluid 225 by using pumps 210 and the gas 205 (step 2.4) into the wellbore 235.

A third stage 620 of the pump schedule 600 may include pumping chlorine dioxide 230 by using pumps 210 and the gas 205 (step 3.1) into the wellbore 235. The third stage 620 may further include pumping the spacer fluid 225 by using pumps 210 and the gas 205 (step 3.2) into the wellbore 235. The third stage 620 may also include pumping the acid 215 by using pumps 210 and the gas 205 (step 3.3) into the wellbore 235. Additionally, the third stage 620 may include pumping the spacer fluid 225 by using pumps 210 and the gas 205 (step 3.4) into the wellbore 235.

After pre-job safety meetings have been completed, the processing equipment may be hooked up in place, and flow and pressure testing using the following sequence of operations may take place. Flow and pressure may be monitored in real-time from the control cab. Chemical quality control monitoring may be performed prior to the start of the job and/or during each stage.

After opening the well head valves, pumping may begin with water (e.g., prep process 505, 506 in FIGS. 5 and 6) to establish flow. This may require 60 to 120 barrels. Once flow rate and functionality have been established, the first stage may begin (e.g., first stage 510, 610 in FIGS. 5 and 6). While times may vary, it may be assumed that 30 barrels a minute of fluid may be maintained. Thus, the chlorine dioxide step in FIGS. 5 and 6 may last for three minutes with 30 BPM of chlorine dioxide solution and 6 BPM of nitrogen. Then, the spacer fluid step in FIGS. 5 and 6 may last for 1 minute, and then the acid step may last for 1 minute. The number and volume of the stages is used strictly for illustration purposes. The volume and number of stages may depend upon the specific well treatment design.

Each of the next stages may be identical (e.g., FIG. 6). However, in one embodiment, they may begin with a 30 barrel water step, 90 barrels of chlorine dioxide, 30 barrels of water, 30 barrels of acid, and another 30 barrels of water.

Once all stages have been completed, the wellbore may be flushed with water to at least the nearest perforation at maximum rate with water and nitrogen containing 3 GPT of dual phase corrosion inhibitor. Upon completion of the treatment, the wellbore may be shut-in for a minimum of 2 hours to allow the chlorine dioxide to completely spend. The wellbore may then be put back in production within 24 hours.

Treatment volumes, chlorine dioxide/acid volume ratios, chlorine dioxide fluid/nitrogen ratios, and/or additive dosage rates may be adjusted or modified to meet the particular well conditions. For example, if an analysis of the water chemistry and solids indicates high carbonate content, the hydrochloric acid ratio in the total job volume may be increased. Alternatively, if no ordinate is indicated, the hydrochloric acid level may be reduced. Other examples may include incorporation of a solvent such as xylene in the chlorine dioxide if there is a high degree of asphaltene or paraffin, or an alternative chelating agent may be used depending upon the type of scale observed.

The rate the jobs are pumped may be determined by the maximum rate the well can take, and practical considerations for pumping logistics and economics. It is anticipated that this method may be used for much higher volume jobs in the future which will allow users to go to higher pump rates.

The present disclosure has been described with reference to exemplary embodiments. Although a limited number of embodiments have been shown and described, it will be appreciated by those skilled in the art that changes may be made in these embodiments without departing from the principles and spirit of the preceding detailed description. It is intended that the present disclosure be construed as including all such modifications and alterations insofar as they come within the scope of the appended claims or the equivalents thereof.

What is claimed is:

1. A method for treating a wellbore, the method comprising:

pumping a chemical solution and nitrogen into the wellbore, wherein the nitrogen strips a portion of the chemical solution from a liquid state into a gas state within the wellbore such that the chemical solution travels further in the wellbore; and pumping an acid solution and nitrogen into the wellbore, wherein the nitrogen strips a portion of the acid solution from a liquid state into a gas state within the wellbore such that the acid solution travels further in the wellbore.

2. The method of claim 1, wherein the chemical solution comprises chlorine dioxide.

3. The method of claim 2, wherein the chemical solution comprises scale inhibitors, chelation agents, filming amines, solvents, or a combination thereof.

4. The method of claim 2, wherein the nitrogen is pumped simultaneously with the chlorine dioxide solution.

5. The method of claim 1, wherein the nitrogen is oxygen-free.

6. The method of claim 1, wherein the acid solution comprises hydrochloric acid, hydrofluoric acid, or both, or citric acid, glutamic acid, or both.

7. The method of claim 2, wherein the acid solution is pumped after the chemical solution.

8. The method of claim 1, further comprising pumping a spacer fluid into the wellbore after the chemical solution and before the acid solution.

9. The method of claim 8, wherein the spacer fluid comprises freshwater, natural or artificial brines, produced water, xylene, hexane, kerosene, or a combination thereof.

10. The method of claim 1, wherein the chemical solution enters into a formation in the wellbore.

11. The method of claim 10, wherein the chemical solution treats the formation by removing damage.

12. The method of claim 10, wherein the chemical solution treats the formation and increases production.

13. A method for treating a wellbore, the method comprising:

pumping chlorine dioxide and nitrogen into the wellbore, wherein the nitrogen strips a portion of the chlorine dioxide from a liquid state into a gas state within the wellbore, such that the chlorine dioxide travels further in the wellbore;

pumping a spacer fluid in the wellbore; and pumping an acid and nitrogen into the wellbore, wherein the nitrogen strips a portion of the acid from a liquid state into a gas state within the wellbore, such that the acid travels further in the wellbore.

14. The method of claim 13, wherein the nitrogen is pumped simultaneously with the acid.

15. The method of claim 13, wherein the nitrogen is pumped after the acid.

16. The method of claim 13, wherein the spacer fluid or the acid includes a gas-dispersible corrosion inhibitor and/or scale inhibitor.

17. The method of claim 13, wherein the nitrogen is pumped continuously with the chlorine dioxide, the spacer fluid, and the acid.

18. A system for treating a wellbore, the system comprising:

a chlorine dioxide unit having chlorine dioxide that is pumped into the wellbore;

a gas unit having nitrogen that is pumped into the wellbore, wherein the nitrogen strips a portion of the chlorine dioxide from a liquid state into a gas state within the wellbore, such that the chlorine dioxide travels further in the wellbore;

a spacer fluid unit having a spacer fluid that is pumped into the wellbore; and an acid unit having an acid that is pumped into the wellbore, wherein the nitrogen strips a portion of the acid from a liquid state into a gas state within the wellbore, such that the acid travels further in the wellbore.

19. The method of claim 13, wherein the chemical solution enters into a formation in the wellbore.

20. The method of claim 19, wherein the chemical solution treats the formation by removing damage in the formation.

* * * * *